Aug. 7, 1945.　　　　E. E. GROVER　　　　2,380,964
SAFETY DEVICE
Filed June 30, 1943

WITNESSES:
William F. Swezey
E. H. Lutz

INVENTOR
Elliott E. Grover
BY
ATTORNEY

Patented Aug. 7, 1945

2,380,964

UNITED STATES PATENT OFFICE 2,380,964

SAFETY DEVICE

Elliott E. Grover, Springfield, Mass., assignor to Westinghouse Electric Corporation, East Pittsburgh, Pa., a corporation of Pennsylvania Application June 30, 1943, Serial No. 492,803

5 Claims. (Cl. 220—89)

This invention relates to safety devices and more particularly to safety devices adapted to rupture when the pressure within the vessel to which they are applied exceeds a predetermined amount.

An object of the invention is to provide a safety device in which the stresses created by excessive pressure in the container or vessel may be localized at a specific point or points on the surface of the safety device.

For convenience in manufacturing and in its application to pressure vessels, I prefer to make the device in the form of a disc and it will be hereafter so described, but such construction is not essential in carrying out my invention.

Safety discs made of a rupturable metallic membrane are, of course, well known. However, when such devices, made in the form of a simple disc, are subjected to pressure, they tend to assume a spherical shape and are stressed equally at all points of the surface. Thus, when the pressure exceeds the limit, the disc ruptures indiscriminately and sometimes forms dangerous flying fragments. The control over the rupture pressure is not at all critical and the operation is so indeterminate that it cannot be said to be responsive to a predetermined pressure condition.

My invention, on the other hand, provides a means for so localizing the pressure effect on a specific point or points of the safety device, that the rupture pressure can be controlled within fairly close limits.

These and other objects are effected by my invention as will be apparent from the following description and claims taken in connection with the accompanying drawing, forming a part of this application, in which:

Figure 1:
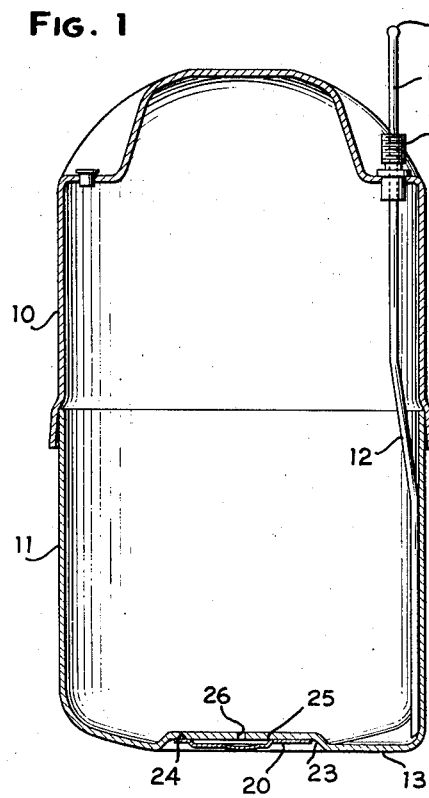
Fig. 1 is a vertical section through a pressure vessel to which my safety device is applied.
Figure 3:
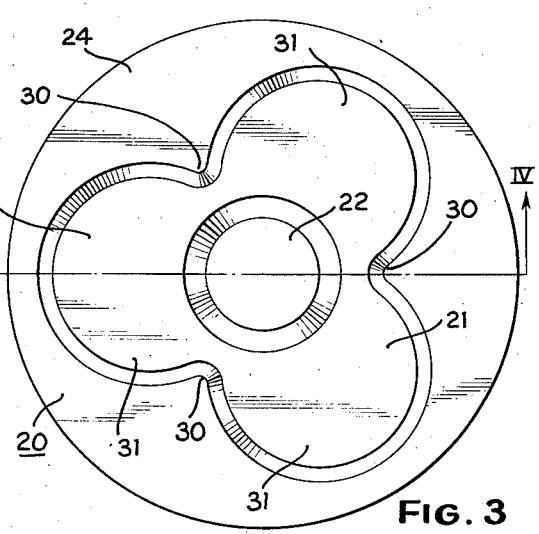
Fig. 3 is an enlarged plan view of the safety device alone.
Figure 4:
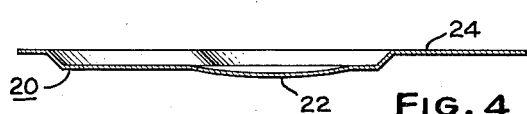
Fig. 4 is a section taken on line IV—IV of Fig. 3.

The pressure vessel illustrated in Fig. 1 comprises a dispenser A of the type disclosed and claimed in the copending application of William B. Anderson, Serial No. 456,555, filed August 28, 1942, and assigned to Westinghouse Electric & Manufacturing Company. It comprises a pair of metal shells 10 and 11 metallically bonded at their juncture to provide a hermetically-sealed vessel. The dispenser is designed to contain a volatile fluid such as dichlorodifluoromethane which serves as a propellant for discharging another fluid, ordinarily nonvolatile, into the atmosphere through a capillary tube 12 extending from a point adjacent the bottom wall 13 of the container, through a nipple 14 to which it is hermetically bonded and having an outlet end 15 disposed outside the container. The outlet end is sealed, as at 16, by a crimping operation or otherwise after the container has been charged. When the charge is to be dispensed, the capillary tube is broken off above the nipple 14. A cap (not shown) may be provided to be screwed onto the nipple 14 to provide a temporary seal for the tube and container.

It is desirable that sealed vessels of this character, having a volatile content such as liquids which vaporize at normal temperatures, and which may be subjected to such conditions of shipping and storage that their temperature and pressure rise rapidly, be provided with some safety device which will release the contents when the pressure inside the vessel has reached some predetermined range.

As I have stated before, it has heretofore been proposed to provide pressure relief devices for pressure vessels. Such devices have taken the form of a frangible disc, a fusible plug, or a spring-pressed valve. So far as I am aware, the discs heretofore employed have been either flat or convex with the result that pressure applied to their surface is distributed equally over the surface thereof. If the predetermined blow-off pressure is relatively low, the disc must be made of metal so thin that it will not stand ordinary handling and use. Further, such discs tend to rupture with a large, jagged-edged hole or else to explode into fragments, creating a hazard.

I have found, however, that if a disc is so constructed that the stresses are localized on one or more predetermined points, I may make the disc of a material heavy enough to withstand ordinary use and yet which will rupture within a predetermined pressure range to relieve the contents of the vessel.

A preferred embodiment of the invention shown in Figs. 1 to 5, inclusive, comprises a thin metal disc 20 having embossed thereon a raised and generally convex portion in the form of a clover leaf 21. The disc is also preferably embossed near its center with a raised circle 22. The disc may be applied to the vessel or container by brazing it into a recess 23 formed in the bottom wall 13 of the container, said recess being sufficiently deep to receive the entire disc within its confines so that the disc is protected against injury when the container is standing on its bottom wall 13. The brazing metal flows between the flat outer portion 24 of the disc and the flat wall portion 25 of the recess 23, thus affording a hermetic seal between the disc and the container. Access between the interior of the container and the rupture disc is provided by an orifice 26 formed in the wall portion 25 of the recess 23.

I have found that the size of the port 26 is rather critical, in that it must be sufficiently large to allow the release of the container at a rate sufficiently fast to relieve the pressure before the vessel itself explodes, but not so large that the discharge from the vessel will cause the vessel to jump violently. For example, I have found that in a container having a capacity of slightly over one pound of liquid dichlorodifluoromethane and containing approximately one pound of that compound, and in which the container itself will explode at or near a pressure of 2,000 pounds per square inch, and which container is provided with a disc adapted to rupture at from 700 to 825 pounds per square inch, the orifice 26 should be approximately one-sixteenth of an inch in diameter.

The embossed circle portion 22 serves as an arch to maintain the center portion of the disc away from the orifice 26 during the brazing operation. Otherwise, the raised portion of the disc would sag and become brazed to the wall portion 25, and materially alter the operating characteristics of the device.

The gist of my invention lies in the provision of the stress points 30 formed at the juncture of each pair of lobes 31. When an excessive pressure develops inside the vessel, these convergent points bear localized stresses which cause a rupture of the disc at at least one of these points, and a tearing of the disc from this point toward the center. The area of disc surface exposed to pressure and the weight and quality of the metal used in making the disc are important in determining the rupture pressure, but these are controllable factors applicable to any type of safety disc.

Obviously, the disc, according to my invention, need not be shaped like a clover leaf. Any stamping or embossing which will provide one or more indentations away from the periphery of the embossing and toward the center will serve equally well. A single indentation, for example, would provide a generally heart-shaped embossing. The clover leaf design, however, provides three stress points as a safety factor.

Figure 6:
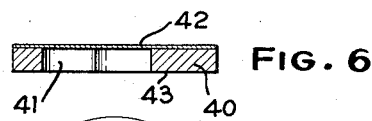
Fig. 6 is a vertical section through a disc, embodying my invention in another form.
Figure 7:
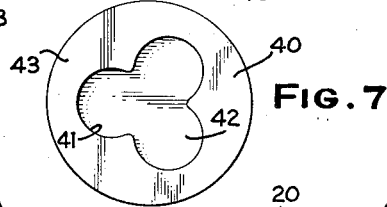
Fig. 7 is a plan view of the disc shown in Fig. 6.
Figure 2:
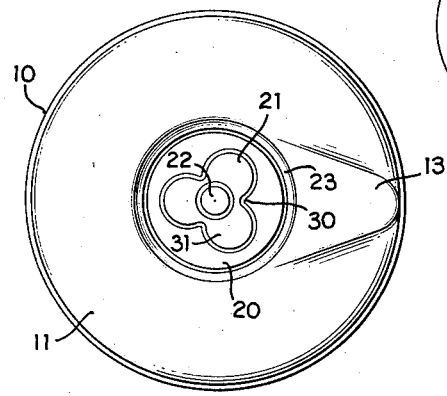
Fig. 2 is a bottom view of the vessel of Fig. 1, showing the safety device in operative position.

Neither is it necessary that the disc itself be embossed. In Figs. 6 and 7, I have shown an embodiment of the invention in which a metal disc 40 of substantial thickness is provided with an opening 41 in the form of a clover leaf. A flat disc 42 of rupturable metal may be brazed or otherwise sealed to the disc 40, thus providing a safety device in which the area exposed to pressure is of clover leaf shape, having stress points similar to the points 30 previously described. The lower side 43 of disc 40 may be attached by suitable means, as brazing or welding, to a wall of a pressure vessel.

Figure 5:
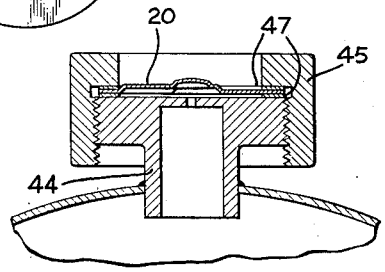
Fig. 5 is a vertical section through a portion of a pressure vessel, showing an alternative manner of applying the safety device.

In Fig. 5, I have shown a method of attaching the safety disc 20 to a pressure vessel by clamping it between a screw-threaded boss 44 attached to the pressure vessel as by welding, and an internally threaded cap 46. Gaskets 47 are preferably provided to form a fluidtight joint. Such a structure would be particularly applicable where the safety device is used on permanent or refillable containers, such as water or steam boilers, and similar containers where provision for replacement of the safety device should be made.

It will be apparent from the foregoing description that my invention provides a safety device having a noncircular area exposed to pressure and having localized stress points which rupture under a predetermined pressure.

While I have shown specific embodiments of my invention, it will be obvious to those skilled in the art that it is not so limited, but is susceptible of various other changes and modifications without departing from the spirit thereof, and I desired, therefore, that only such limitations shall be placed thereupon as are specifically set forth in the appended claims.

What I claim is:

1. A safety device rupturable upon the application of a predetermined pressure, said device comprising a thin metallic membrane of uniform thickness having a portion only of its area exposed to a pressure source, said exposed portion being non-circular in outline and having at least one radial indentation between its outermost exposed edge and its center providing a point where the stresses produced by the pressure source are concentrated.

2. A device according to the preceding claim wherein the center of the membrane has a circular embossing to reinforce the membrane.

3. A device according to claim 1 wherein the non-circular exposed portion has substantially the shape of a clover leaf.

4. In combination, a closed vessel adapted to contain a fluid, means associated with said vessel for relieving excessive pressure generated therein, said means comprising a thin metal membrane of uniform thickness sealed at its periphery to said vessel, the remainder of said membrane being noncircular in outline and being exposed to the pressure generated in said vessel, a wall of said vessel having therein an orifice of predetermined diameter providing communication between the interior of said vessel and the inner side of said membrane, said membrane being provided with indentations extending inwardly from the periphery of a circle circumscribing the outer edge of the exposed area toward its center to provide rupturable stress points.

5. In combination, a closed vessel adapted to contain a fluid, means associated with said vessel for relieving excessive pressure generated therein, a wall of said vessel being provided with a recess for receiving said means, said means comprising a thin metal membrane of uniform thickness sealed at its periphery to said vessel within said recess, the remainder of said membrane being substantially convex and being exposed to said pressure source through an orifice of predetermined diameter provided in a wall of said recess, said exposed portion being non-circular in outline and having at least one radial indentation between its outermost exposed edge and its center providing a point where the stresses produced by the pressure source are concentrated.

ELLIOTT E. GROVER.